(No Model.)  2 Sheets—Sheet 1.

W. T. WITHERS.
MEASURING FAUCET.

No. 371,240.  Patented Oct. 11, 1887.

WITNESSES:

INVENTOR, (No Model.) 2 Sheets—Sheet 2.

W. T. WITHERS.
MEASURING FAUCET.

No. 371,240. Patented Oct. 11, 1887.

WITNESSES:
Rich'd M. Yake
W. H. Seawell

INVENTOR,
W. T. Withers
BY
J. C. Higdon
ATTORNEY.

UNITED STATES PATENT OFFICE.

WILLIAM T. WITHERS, OF LIBERTY, MISSOURI.

MEASURING-FAUCET.

SPECIFICATION forming part of Letters Patent No. 371,240, dated October 11, 1887.

Application filed November 8, 1886. Serial No. 218,259. (No model.)

*To all whom it may concern:*

Be it known that I, WILLIAM T. WITHERS, of Liberty, Clay county, Missouri, have invented certain new and useful Improvements in Measuring-Tanks, of which the following is a full, clear, and exact description, reference being had to the accompanying drawings, forming a part hereof.

This invention relates to an air-tight self-measuring tank to be used for storing inflammable or gaseous liquids, such as coal-oil or gasoline; and the objects which I seek to accomplish by it may be enumerated as follows: to provide improved devices for handling the liquids after they have been placed in the tank, whereby they may be drawn therefrom by accurate measure and without danger of being ignited during the process of drawing.

The invention may be said to consist in the arrangement, construction, and combination of measures which are permanently attached to the tank, and peculiarly-constructed valves, as hereinafter set forth.

Figure 1:
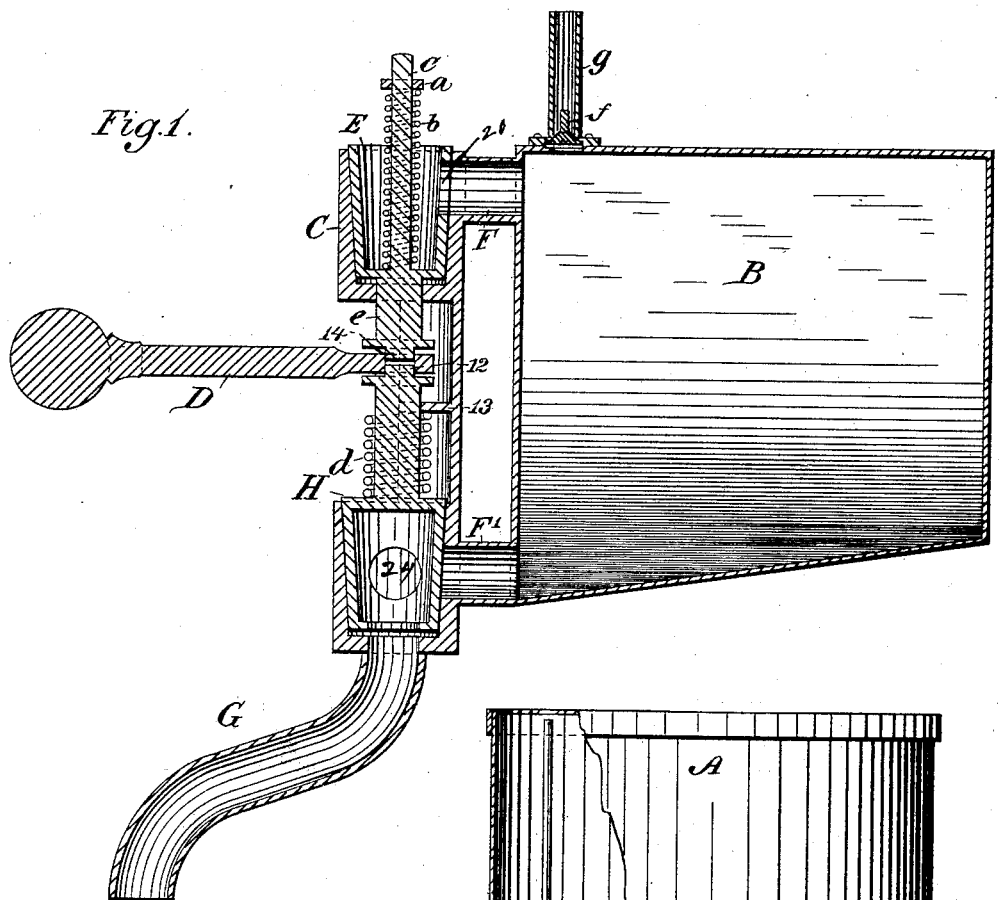
Figure 2:
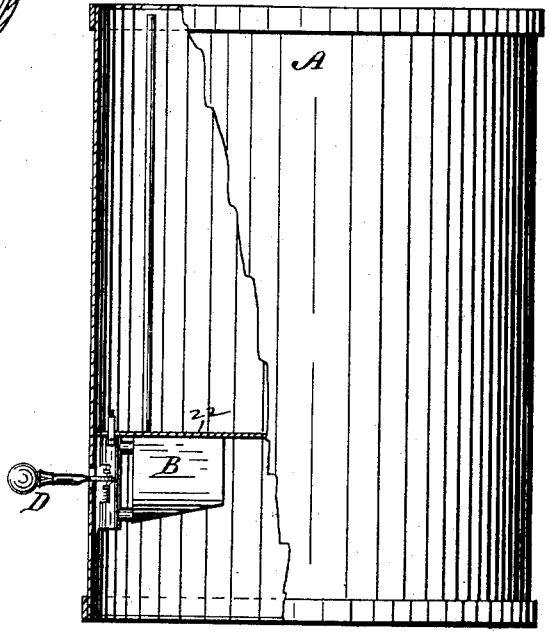
Figure 3:
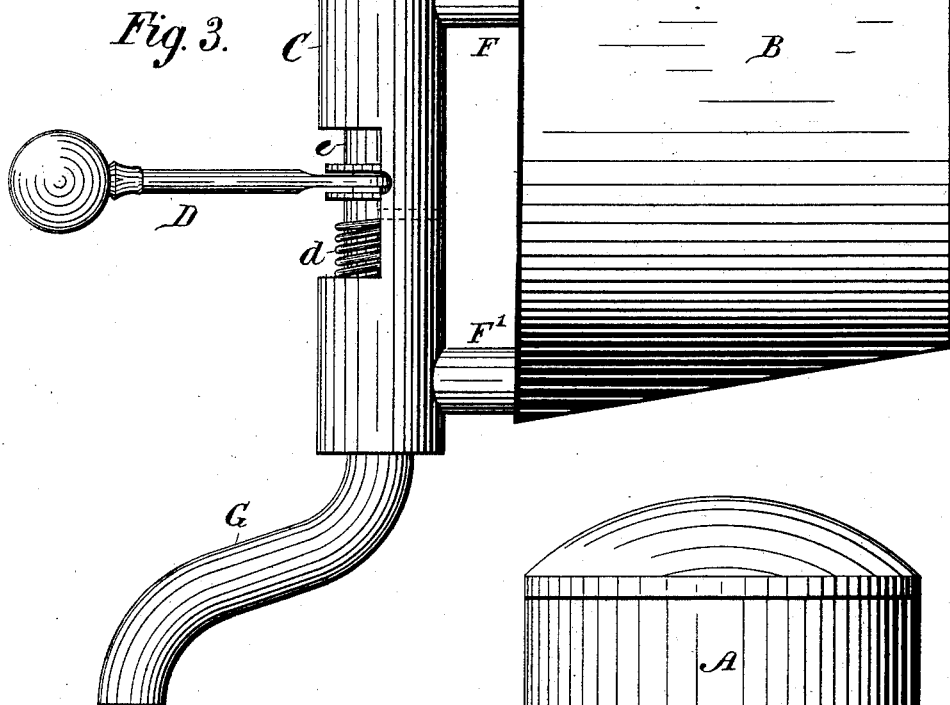
Figure 4:
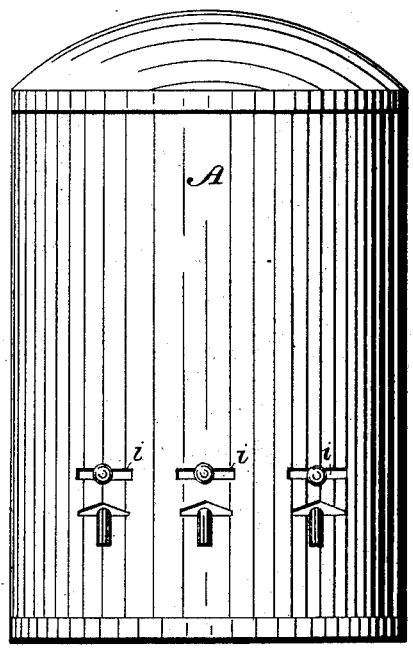

In the drawings, which illustrate the manner of carrying out the invention, Figure 1 is a longitudinal section through one of the measures and its attached valve. Fig. 2 is a sectional elevation of a tank to which my invention has been applied, a portion of said tank being broken away to show the arrangement of the interior, and the figure being on a smaller scale than that of the first mentioned. Fig. 3 is a view of the devices shown in the first-mentioned figure as they appear when attached to the bottom of the tank; and Fig. 4 is a front view of the tank shown in Fig. 2.

The letter A indicates the body of the main tank. The bottom 22 of the tank is, it will be noticed, located at some distance above the floor, so as to afford sufficient room beneath it for a series of measures, such as B. The measures may be of any desired capacity—such, for instance, as a gallon, quart, and pint—and they are made separate and apart from each other, and are controlled by separate valves. A casing, C, for containing the turning-plugs E and H, is also located below the bottom of the tank A, and it is connected to the measure by short tubes or passages F and F'. The valve-casing C is preferably cast in a single piece, as shown, with a small partition or projection upon its interior, against which the upper end of the spring *d* bears in urging the lower valve to its seat. The number 13 represents said projection. Upon the front side of the said casing, and about midway of its length, a portion of the metal is cut away, so as to form a recess for the inner end of the lever or handle D to operate in. A spout, G, is attached in any desired way to the lower end of the valve-casing, so that its lower end will project out of the tank a convenient distance.

The valves or turning-plugs E and H are made tapering upon their outer surface, and corresponding seats are provided for each of them in the casing C. In this description I desire to term them the "filling" and "discharge" plugs, respectively. The filling-plug E and the discharge-plug H are separate and distinct from each other, yet they are loosely connected together by the operating-handle D, and both are operated by its movements. The said filling-plug E is open at its upper end and allows the free entrance of the liquid from the tank. From the interior of this plug the liquid passes out through the opening 20, which is made in one side thereof, and it enters the measure by way of the upper passage, F. The plug E is provided with a guiding-stem, *c*, which is encircled by a spiral spring, *b*, and a bridge or cross-bar, *a*, is formed upon or attached to the upper portion of the plug-casing for the purpose of guiding the upper end of said stem, and against which the upper end of the spring *b* bears in urging said plug to its seat in the casing.

Both the filling and discharge plugs, it will be observed, are held securely to their respective seats in the valve-casing by means of a cross-bar or bridge in combination with a suitable spring for retaining them in position. The object of the springs is to keep the plugs firmly seated and in proper position without the use of rigid adjustments, such as screws or levers, thus holding said plugs in position with but sufficient pressure to allow them to be moved with little expenditure of power and yet form tight joints with the casing.

To more fully explain the merits of my invention, I will say that when the handle D of the plugs is turned toward the right hand in Fig. 4 the fluid in the tank will enter the measure by way of the upper passage, F, and so fill it, the same movement of said handle causing the discharge-plug H to be closed. After the measure has been filled a reverse movement of the handle D will cause the filling-plug E to be closed and the discharge-plug to be opened, thus discharging the contents of the measure through the spout G into the vessel that is to receive the same. The opening 20 in the side of the filling-plug being located at a substantially right angle to the opening 24 in the discharge-plug, it is obvious that the action of the handle D is to close the said filling-plug before the discharge is opened, thus preventing any fluid from the tank from entering the measure before the discharge is closed. By placing the handle in a position midway between the two extreme positions, or in the position shown in Fig. 4, both filling and discharge plugs will be closed.

The lower end of the filling-plug stem $e$ is provided with a squared portion, 14, which is engaged by a correspondingly-shaped socket in the handle D, and likewise the upper end of the stem of the discharge-plug is also provided with a squared portion, 12, which is engaged by the socket in the handle, as shown. In this way both the plugs are loosely connected together, and are permitted to operate together without undue wear and friction.

For the purpose of permitting all of the fluid to quickly run out of the measure when the plugs are properly manipulated, I have formed the bottom thereof in such a manner that it will be sharply inclined toward the discharge-passage F'.

Each measure that is located in the tank is to be supplied with an air-valve, $f$, and an air-tube, $g$. Said air-tube extends from the top of the measures upwardly and opens as near as possible to the top of the tank, as shown.

The purpose of the air-tubes is to supply air to the measures, and thereby allow them to be quickly emptied after they have been filled. At the lower end of the air-tube $g$ an air-valve, $f$, is seated, so that it will allow air to pass downward into the measure, and yet it will close against the end of said tube when the measure has been completely filled, and thereby prevent the liquid from passing into the tube. The action of this valve is very similar to that of an ordinary check-valve as used in pumps of all descriptions.

By the use of my improved valves and measures in practice the most dangerous fluids can be drawn in the dark, or without the use of a lamp or light of any kind, and with exactness.

The air-tube before mentioned relieves the air from the measures when filling, and when full the fluid will float the valve $f$ to its seat and not permit said tube to be filled above the top of the measures.

Having thus described my invention, what I claim is—

1. In a self-measuring vessel for oils, &c., a suitable casing in communication with a main receptacle and a measuring-tank, and provided with a suitable discharge-spout, in combination with filling and discharge plugs adapted to be simultaneously turned by a suitable handle operating in a recess in said casing, substantially as described.

2. In a self-measuring vessel for oils, &c., one or more measuring-tanks located below a main receptacle and each provided with an air-tube extending through the main receptacle, each tube being provided with an air-valve, whereby the fluid being handled is kept out of the tube, in combination with a valve-casing in which operate the filling and discharge plugs, substantially as described.

3. In a measuring-tank, the filling-plug E, made tapering upon its outer surface and having side opening, 20, in combination with plug H, also made tapering upon its outer surface and having opening 24, and both loosely connected together, substantially as described.

4. The combination of the tank A with measure B, plugs E and H, casing C, springs $b$ and $d$, spout G, extending from the lower portion of the casing, and operating-handle D, substantially as described.

In testimony whereof I affix my signature in presence of two witnesses.

WILLIAM T. WITHERS.

Witnesses:
 THOS. B. MCAULEY,
 THOMAS A. HARRIS.